United States Patent Office 3,847,888
Patented Nov. 12, 1974

3,847,888
ULTRA-HIGH MOLECULAR WEIGHT POLYETHYLENE MOLDING POWDER AND MOLDING PROCESS
Eugene R. Baumgaertner, Florham Park, N.J., assignor to Allied Chemical Corporation, New York, N.Y.
No Drawing. Filed Dec. 1, 1972, Ser. No. 311,062
Int. Cl. C08f 29/04, 47/02
U.S. Cl. 260—94.9 GD 8 Claims

ABSTRACT OF THE DISCLOSURE

Molding powder of ultra-high molecular weight, linear polyethylene comprising particles of less than 100 micron mean particle size having narrow particle size distribution is free-sinterable to form solid articles by a process comprising (a) molding a solid preform by compressing the polyethylene molding powder at a temperature below its crystalline melting point under pressure of at least 2,000 p.s.i., (b) releasing the pressure and (c) free-sintering the preform at temperature above its crystalline melting point.

BACKGROUND OF THE INVENTION

Ultra-high molecular weight, linear polyethylene, having molecular weight of at least about $1 \times 10^6$ and density of between 0.92 to 0.99 has been known for some time. On account of its outstanding physical properties including toughness, impact strength, abrasion resistance, low coefficient of friction, combined with excellent resistance to attack by solvents and corrosive chemicals, it has been found useful in demanding applications including vibration dampener pads, hydraulic cylinders, mallet heads, flexible drive couplings, gears, belt and chain guides, door stops, bumpers, machinery carriages, conveyor equipment components, bearings, and especially in textile machine parts such as loom pickers, drop box pickers, lock straps, sweep sticks, lock connectors, pick arm stop bolts, and the like. Its use, however, has been limited because of fabrication difficulties. Due to its high molecular weight it has very high melt viscosity, which makes it difficult or impractical to fabricate it by conventional thermoplastic processing techniques, such as injection molding. Not only that, it is also sensitive to melt shear, which causes melt fracture and physical degradation.

Previously available methods for fabricating ultra-high molecular weight polyethylene include compression molding, flow molding, transfer molding and ram extrusion, all of which are cumbersome and slow as compared to melt extrusion usually employed for thermoplastic materials. Compression molding of such ultra-high molecular weight polyethylene requires maintenance of the molded part under elevated temperature and pressure in the mold for extended periods of time to melt the polyethylene and to allow it to melt flow into a solid article free of voids, and then cooling it under pressure while confined in the mold. Equipment required for such operation is complex and expensive and production rates are exceedingly slow. A plurality of identical molds are usually required in order to permit acceptable production rates. Therefore, there is a need for a simplified molding process for forming articles of ultra-high molecular weight, linear polyethylene.

It is an object of the present invention to provide a new method for forming solid articles of ultra-high molecular weight, linear polyethylene, and a molding powder of such polyethylene suitable for use in that process.

DESCRIPTION OF THE INVENTION

It has now been discovered that ultra-high molecular weight, linear polyethylene of very specific finely divided powder form can be fabricated into solid articles having excellent physical properties by (1) compressing the polyethylene powder at a temperature below its crystalline melting point under pressure of at least about 2,000 p.s.i. to form a preform, (2) releasing the pressure, and (3) free-sintering the preform by subjecting it to elevated temperature above its crystalline melting point usually in the range of 275° to 350° F. for time sufficient to permit the powder particles to sinter into a solid article having the shape of the preform.

In accordance with the present invention there is provided molding powder of ultra-high molecular weight, linear polyethylene, having molecular weight of at least $1 \times 10^6$ and density of 0.92 to 0.99, free-sinterable at a temperature above its crystalline melting point after molding under pressure of at least 2,000 p.s.i. to form a solid article having tensile strength of at least 4,000 p.s.i. and elongation of at least 200 percent, comprising particles of less than 100 micron mean particle size having distribution function of less than 0.80.

The present invention further provides a method for making solid articles of ultra-high molecular weight, linear polyethylene by free-sintering procedure which comprises (1) compressing molding powder of ultra-high molecular weight, linear polyethylene having molecular weight of at least $1 \times 10^6$ and density of from 0.92 to 0.99 comprising particles of less than 100 micron mean particle size having distribution function of less than 0.80 under pressure of at least 2,000 p.s.i. at a temperature below its crystalline melting point to form a solid preform, (2) releasing the pressure, and (3) free-sintering the preform at temperature above the crystalline melting point of the polyethylene, usually at a temperature in the range of 275° to 350° F.

DETAILED DESCRIPTION OF THE INVENTION

Ultra-high molecular weight polyethylene suitable for use in the present invention may be prepared by known procedures. It is commercially available. It has been prepared by the Phillips low pressure ethylene polymerization process using a chromium oxide catalyst on a silica or silica-alumina support in paraffinic or cycloparaffinic solvent to form the polymer in solution or as discrete particles in a hydrocarbon slurry. It has also been prepared by the Zeigler process using active metal alkyl catalyst, or by such processes as described in U.S.P. 3,050,514, and especially by the process outlined in U.S.P. 3,051,993. The latter process involves at least intermittently contacting anhydrous oxygen-free ethylene in gaseous phase with an inorganic, porous, frangible, solid contact catalyst prepared from an inorganic compound of chromium and oxygen and an active metal alkyl.

Ultra-high molecular weight, linear polyethylene suitable for use in the present invention has molecular weight, calculated from viscosities in decalin solution at 135° C. by the P. Francis et al. formula $[N] = 6.77 \times 10^{-4} (M^{0.67})$ (c.f. P. Francis et al. *J. Pol. Sci.* 31, 453 (1958)) in the range between about $1 \times 10^6$ and about $5 \times 10^6$ and above. Since abrasion resistance and other advantageous properties increase with increasing molecular weight, ultra-high molecular weight polyethylene having molecular weight of at least about $2 \times 10^6$ is preferred. Ultra-high molecular weight polyethylene suitable for use in the present invention has densities in the range from 0.92 to about 0.99, usually from about 0.935 to about 0.960 at 23° C., determined by ASTM Method D792. Its crystalline melting point is in the order of about 275° F.

The term "polyethylene" as used in the specification and claims refers to homopolymer of ethylene as well as to copolymers thereof with minor amounts of α-olefins copolymerizable therewith, such as, for example, 1-alkenes having 3 to 8 carbon atoms such as propylene, butene-1, 2-methylpropene-1, 4-methylpentene-1, and 2,4,4-trimethylpentene-1, generally containing not less than 85 weight percent, and preferably not less than 96 weight percent of polymer units derived from ethylene. Such copolymers have essentially the same characteristics as the ethylene homopolymer of the same ultra-high molecular weight, and they have the same preforming and sintering characteristics.

Typical properties of some commercial types of ultra-high molecular weight, linear polyethylenes suitable for use in the present invention are shown in Table I below.

Ultra-high molecular weight linear polyethylene as obtained from the polymerization process is usually a granular powder of particle size well above 100 microns. Molding powder of the present invention is obtained by comminuting such coarse, granular powder until it has been reduced to mean particle size of 100 microns at distribution function of less than 0.80. Any commercially available milling equipment capable of achieving such combination of particle size and particle size distribution is suitable for making the molding powder of the present invention. Suitable equipment includes fluid energy mills wherein milling is principally effected by interparticulate collision of the polymer particles, mechanical mills where- TABLE I.—TYPICAL PROPERTIES [1] OF ULTRA-HIGH MOLECULAR WEIGHT, LINEAR POLYETHYLENE

| Property | Units | ASTM test method | Value | | |
|---|---|---|---|---|---|
| Molecular weight | | | $1.5 \times 10^6$ | $2.8 \times 10^6$ | $>5.0 \times 10^6$ |
| Crystalline melting point | °F | | 275 | 275 | 275 |
| Specific gravity | gm./cc | D792-66 | 0.940 | 0.936 | 0.930 |
| Melt index (21.6 kg., 190° C.) | gm./10 min | D1238-65 | 0.00 | 0.00 | 0.00 |
| Tensile strength at 73° F., 2"/min | p.s.i | D638-68 | 5,600 | 5,600 | 6,000 |
| Yield strength at 73° F., 2"/min | P.s.i | D638-68 | 3,100 | 3,100 | 3,000 |
| Ultimate Elongation at 73° F., 2"/min | Percent | D638-68 | 525 | 450 | 200 |
| Izod impact (notched) | Ft.-lb./in. notch | D256-56 | [2] >20 | [2] >20 | [2] >20 |
| Tensile impact (Type L) | Ft.-lb./in.[2] | D1822-68 | >1,000 | 850 | |
| Stiffness, cantilver beam | | D747-63 | 80,000 | 80,000 | 80,000 |
| Compression modulus | P.s.i | D695-69 | 110,000 | 110,000 | |
| Rockwell hardness | R. scale | D785-65 | 50 | 50 | 50 |
| Tear strength | Gm./mil | D1004-66 | 550 | 550 | |
| Heat deflection temperature, 264 p.s.i | °F | D648-56 | 113 | 113 | 115 |
| Coefficient of thermal linear expansion (−22° F. to 86° F.) | In./in.°F | | $7.2 \times 10^{-5}$ | $7.2 \times 10^{-5}$ | |
| Brittleness temperature | °F | D746-64 | <−94 | <−94 | <−94 |
| Coefficient of friction, static | | | 0.11 | 0.11 | |
| Environmental stress crack resistance (0.75", 100% Igepal, 100° C.) | Hrs | D1693-70, P-34 | >2,000 | >2,000 | |
| Abrasion resistance (Taber) | Gm./10,000 cycles | D1044-56 | 0.013 | 0.008 | |
| Dielectric constant: | | | | | |
| 100 Hz | | D150-68 | 2.34 | 2.34 | 2.34 |
| 10⁶ Hz | | | 2.30 | 2.30 | 2.30 |
| Dissipation factor: | | | | | |
| 100 Hz | | D150-68 | 0.0003 | 0.0003 | 0.0003 |
| 10⁶ Hz | | | 0.0002 | 0.0002 | 0.0002 |
| Dielectric strength: | | | | | |
| Short time | Volts/mil | D149-64 | 710 | 710 | 710 |
| Stepwise | | | 680 | 680 | 680 |
| Volume resistivity | Ohm/cm | D257-66 | $>10^{16}$ | $>10^{16}$ | $>10^{16}$ |
| Water absorption | Percent 24 hours, 1/8" | D570-63 | Nil | Nil | >0.01 |
| Burning rate | | D635-68 | (3) | (3) | (3) |

[1] Determined at 73° F. and 50% relative humidity.
[2] Deflects but does not break.
[3] Very slow.

In order to be free-sinterable in accordance with the method of the present invention, ultra-high molecular weight, linear polyethylene must have mean particle size of less than 100 microns, and it must have a distribution function of less than 0.80.

Mean particle size as used herein is the particle size determined by use of the Coulter Counter. The Coulter Counter provides a method for determining particle size in the 1 to 100 micron range which is based on the principle of changes in the electrical conductance of an electrolyte solution containing suspended therein the particles the size of which is to be determined as the solution and suspended particles pass through a small orifice. Coulter Counters are commercially available instruments.

Distribution function may be determined from particle counts at a number of particle size intervals as determined on a Coulter Counter. Average particle counts at a number of predetermined particle size intervals are determined, the weight percent and cumulative weight percent are calculated for each particle size interval, and the cumulative percentages of particle size in microns within the particle size intervals are plotted on probability paper. The best fit line is drawn through the plot. The particle size at the 50 and 84 percent probability level is determined and the distribution function is calculated as average particle size in microns at the 50 percent probability level minus average particle size in microns at the 84 percent probability level, divided by the average particle size in microns at the 50 percent probability level.

in particle size reduction is principally effected by collision of polymer particles with rotating mill parts, or mills combining the principles of fluid energy milling and mechanical milling.

In fluid energy mills the granular polymer powder to be reduced in particle size is subjected to action of expanding grinding fluid such as air or an inert gas, e.g., nitrogen, argon or fluorocarbons. Suitable equipment includes air mills such as the "Jet-O-Mizer" manufactured by the Fluid Energy Processing and Equipment Company. A high degree of interparticulate collision is accomplished by utilizing this type of air mill which has the shape of a hollow elongated toroid. The mill stands vertically with one curved end at the top and the other curved end at the bottom so that the straight elongated sides which are substantially parallel are in vertical position. The coarse, granular material is fed into the lower curved end of the mill (grinding chamber). The grinding fluid is fed into the same end of the mill under high pressure to effect grinding of the feed particles by interparticulate collision. Temperature is preferably held within the range of 0 to 200° F. It is not permitted to rise above about 250° F. Low grinding temperatures tend to improve mill performance due to increased brittleness of the resin. Starting material feed to the grinding chamber is accomplished through a venturi feeder. The air or other grinding fluids are forced under high pressure through nozzles into the grinding chamber wherein the expanding grinding fluid causes repeated impact of the resin particles resulting in rapid size reduction. The material is forced from the grinding chamber through an upstack, which is one of the straight elongated portions of the mill, into the upper curved section wherein classification takes place. In the classification zone smaller particles are removed and the larger particles are thrown to the outside by centrifugal force and remain in the mill returning to the grinding chamber by means of a "downstack" which is the counterpart of the upstack and is substantially parallel thereto.

Another type of fluid energy mill suitable for effecting size reduction to make molding powder of ultra-high molecular weight, linear polyethylene in accordance with the present invention is the circular air mill of the "Micronizer" type which is a hollow horizontal toroid consisting of a circular grinding chamber having peripherally spaced orifices for introducing the grinding fluid tangentially into the grinding chamber, and having a centrally located exhaust opening. The coarse, granular material is introduced into the grinding chamber through a venturi feed jet. Tangential positioning of the orifices through which grinding fluid is introduced into the mill under high pressure insures rotation of mill content in one direction. Expansion of grinding fluid within the mill causes high speed rotation of the feed material to be pulverized and interparticulate collision thereof, resulting in size reduction. Centrifugal force causes larger size particles to remain near the periphery of the grinding chamber, while material of fine particle size is drawn with the exhausting grinding fluid towards the inside of the grinding chamber and is removed from the mill through the centrally located exhaust opening. In this mill grinding and classification occur concurrently.

A different type of fluid energy mill suitable for making the molding powder of the present invention is disclosed in U.S.P. 2,704,635 which has opposing jets and a circulatory classification system.

A further type of mill suitable for making the molding powder of the present invention is the "Cyclo-Jet" mill of the type described in U.S.P.'s 3,348,779 and 3,468,489 supplied by the Fluid Energy and Processing Equipment Company. "Cyclo-Jet" mills combine the comminuting action of expanding high velocity grinding fluids, resulting in interparticulate collision, with that of rotating anvils, resulting in mechanical impact of particles with rotating mill parts.

Molding powder in accordance with the present invention may also be made by comminuting coarse, granular ultra-high molecular weight, linear polyethylene as obtained from the polymerization process by means of an enclosed bladed rotor rotating at high peripheral speeds in the order of about 10,000 feet per minute in a vortex of air or other gaseous medium, such as provided by the "Hurricane Mill" supplied by Bauer Bros. of Dayton, Ohio.

Other means, though generally less efficient for making molding powder of the present invention, include the purely mechanical mills, such as hammer mills. Such mills generally require repeated passage of the material through the mill in order to reduce particle size to required degree of fineness and to obtain narrow particle size distribution corresponding to distribution function of less than 0.80. Similarly, molding powder obtained by grinding in an air mill having required mean particle size of less than 100 microns, but having distribution function in excess of 0.80 can be subjected to repeated passages through such mill in order to reduce the distribution function to a value below 0.80.

As previously stated, the molding process of the present invention involves compressing the molding powder under pressure of at least 2,000 p.s.i. at a temperature below its crystalline melting point into a cavity having the size and shape of the desired article to obtain a solid preform having strength sufficient for normal handling. The requirement that molding of the preform is accomplished at a temperature below the crystalline melting point of the molding powder means that the molding powder is present in the mold substantially in solid form, not in the melt, although if desired, the mold itself may have higher temperatures, and even though some of the molding powder may have such higher temperatures. This requirement, however, makes it clear that the present process does not rely on melt flow under pressure in order to form desired solid articles, but that the preform obtains its solidity substantially solely from cohesion of the molding powder particles, and consolidation into final product occurs in the following free-sintering operation in the absence of external pressure. The term "free-sintering" means subjecting the solid preform to elevated temperature in the absence of externally applied pressure without being confined in a mold. Green strength of preforms so obtained will generally be sufficiently high so that these preforms can be handled conveniently without need for onerous handling precautions. They are strong enough to be transported and stored prior to the free-sintering step, and to withstand the presintering step without deformation. The preforms are then subjected to temperatures above the crystalline melting point of the polyethylene, usually at least about 275° F. for time sufficient to sinter them into solid articles having the form and shape of the preform and having tensile strength of at least about 4,000 p.s.i. and elongation of at least about 200 percent. Tensile strength and elongation are determined by ASTM Method D638–68. Suitable free-sintering temperatures usually range from about 275° F. to about 350° F., preferably about 300° to 320° F. Temperatures above about 350° F. are preferably avoided since they may cause discoloration and/or sagging of the preform. In the free-sintering step it is essential that the preform is brought to minimum sintering temperature (above the crystalline melting temperature of the polyethylene, say at least about 1° F. above that crystalline melting point) throughout, and is then maintained at that temperature for time sufficient to allow sintering into an article having the required tensile strength and elongation. In order to bring the center of the preform to sintering temperature, it will ordinarily be necessary to heat the preform for a period of 2 to 4 hours per inch of thickness. In order to obtain uniform heating of the preform throughout it will often be desirable, though it is not required, to heat it slowly to desired final sintering temperature for example at a rate of temperature increase of 20° F./hr. to 150° F./hr. particularly if the preform embodies portions of substantial thickness. Similarly, it will generally be of advantage to allow gradual cooling of the sintered article from sintering temperature at similar rates, thereby minimizing thermal stresses within the article. In order to prevent yellowing of the polyethylene in the sintering operation, it is often preferred to conduct that operation in an inert medium, e.g., in a nitrogen atmosphere.

Preform pressures should be at least about 2,000 p.s.i. Although it is possible to obtain solid preforms at lower preform pressures, preforms so obtained have high void content and upon sintering yield only articles having inferior tensile and elongation properties. Preform pressures of about 6,000 p.s.i. usually will result in articles having good tensile and elongation properties, although preform pressures of 8,000 p.s.i. or higher will yield article having slightly better properties yet. At pressures above about 10,000 p.s.i. any improvement in properties will generally be too small to justify the expense of using the type of equipment required for obtainment of such pressures. Of course, there is no upper limit to the preform pressure that may be employed, other than that of economies in equipment design.

DESCRIPTION OF THE PREFERRED EMBODIMENTS

The example below illustrates preferred embodiments and sets forth the best mode for practice of the invention presently contemplated. It is not to be construed as a limitation on the invention.

EXAMPLE

Ultra-high molecular weight, linear polyethylene having molecular weight of $2.8 \times 10^6$ and density of 0.94, having mean particle size of about $320\mu$ was milled to fine particle size in a Model 0202 Jet-O-Mizer air mill manufactured by the Fluid Energy Processing and Equipment Company. Air was supplied to the mill at a pressure of 95 p.s.i.g., a temperature of 72° F. and a rate of about 100 s.c.f.m. Polyethylene feed rates of individual batches to the mill varied from 0.5 to 50 pounds per hour. Feed rates were varied in order to obtain molding powder of different particle size, higher feed rates resulting in larger mean particle size and numerically greater distribution function. Molding powders so obtained were formed into 2 inch diameter billets by subjecting them in a mold to pressure of 6,000 p.s.i., holding the pressure for three minutes, releasing the pressure, removing the billet preforms from the mold and free-sintering them in an oven by subjecting them to programmed heating, first from ambient temperature (about 70° F.) to 225° F. at a rate of 150° F./hr., followed by heating from 225° F. to 325° F. at a rate of 75° F./hr., holding at 325° F. for four hours and then cooling at approximately the same rates as employed for heating. In each case, molding at 6,000 p.s.i. pressure yielded preforms which could easily be handled without danger of breakage. Properties of the free-sintered billets were determined on tape skived from the billets.

Table II below summarizes these experiments, showing polymer feed rate to the mill, particle size and distribution function of the resultant molding powder, as well as tensile strength and elongation of the free-sintered billet.

TABLE II

| Run No. | Polymer feed rate, p.p.h. | Particle size, μ | Distribution function | Percent retained on 100 U.S. mesh screen | Tensile strength, p.s.i. | Percent elongation |
|---|---|---|---|---|---|---|
| 1 | .5 | 64 | .04 | | 7,400 | 37 |
| 2 | 1 | 62 | .06 | 1 | 7,800 | 386 |
| 3 | 2 | 66 | .10 | 4 | 6,400 | 328 |
| 4 | 4 | 88 | | | 6,000 | 220 |
| 5 | 25 | 150 | | 39 | | |
| 6 | 2 | 44 | .43 | 4 | 5,600 | 311 |
| 7 | 4 | 75 | .68 | 20 | 5,200 | 274 |
| 8 | 8 | 66 | .62 | 16 | 4,500 | 256 |
| 9 | 25 | 123 | .56 | 31 | 2,900 | 117 |
| 10 | 50 | 150 | .57 | 39 | 2,700 | 103 |
| 11 | .5 | 54 | .17 | 1 | 8,300 | 430 |
| 12 | 1 | 54 | .15 | 2 | 8,000 | 480 |
| 13 | 2 | 62 | .10 | 11 | 6,600 | 386 |
| 14 | 4 | 56 | .53 | | 5,800 | 352 |
| 15 | 8 | | | | | |
| 16 | 25 | 60 | .58 | 10 | 3,800 | 227 |
| 17 | 35 | 67 | .60 | 13 | | |
| 18 | 50 | 116 | .64 | 27 | 2,650 | 104 |
| 19 | 1 | 58 | .09 | 1 | 5,900 | 362 |
| 20 | 2 | | | 8 | 6,600 | 382 |
| 21 | 4 | 67 | | 9 | 6,000 | 368 |
| 22 | 8 | 64 | .67 | 14 | 4,300 | 271 |
| 23 | 25 | 87 | .62 | 24 | 3,600 | 223 |
| 24 | 50 | 106 | .50 | 28 | 2,900 | 34 |

In Table II, runs designated 5, 9, 10, 17 and 22 resulting in particle size of more than 100 microns represent comparative experiments.

The data in Table II indicate that, although there is some variation in individual runs, molding powder in accordance with the present invention having particle size of less than 100 microns can be free-sintered at a temperature above its crystalline melting point (here at a sintering temperature of 320° F.) into solid objects having tensile strength of at least 4,000 p.s.i. and having elongation of at least 200 percent. Molding powder having particle size of more than 100 microns can be free-sintered only to form inferior product having substantially lower tensile strength and elongation. The data in Table II clearly demonstrate the criticality of particle size required to obtain molding powder free-sinterable into solid objects having acceptable tensile and elongation properties.

It has further been found that, molding powders free-sinterable to form solid objects having tensile strength of at least 4,000 p.s.i. and elongation of at least 200 percent, must have distribution function of less than 0.80 in combination with particle size of less than 100 microns. Molding powder of ultra-high molecular weight polyethylene having particle size of less than 100 microns, but distribution function in excess of 0.80 are not free-sinterable to obtain solid objects having tensile strength of at least 4,000 p.s.i. and elongation of at least 200 percent, but yield only products having lesser tensile and elongation properties which are not commercially acceptable for uses in which ultra-high molecular weight polyethylene articles are commonly employed.

In general, in the molding powders of the present invention tensile strength and elongation of free-sintered articles made therefrom increases with decreasing particle size. For that reason, preferred molding powders in accordance with the present invention have mean particle size of less than about 75 microns and more preferred yet, particle size of less than 50 microns. Size reduction to substantially below 50 micron mean average particle size results only in relatively small increases of tensile strength and elongation. Molding powders in accordance with the present invention preferably have distribution function of less than 0.70 or, more preferably yet, of less than about 0.50.

Fabrication of the molding powders of the present invention, and properties of articles made therefrom may, if desired, be improved by incorporating therein additives such as stabilizers or inert fillers.

To improve thermal stability during free-sintering operation, it is often desirable to add one or more stabilizers to the molding powders, of the type and in the amounts usually employed to improve thermal stability, oxidation resistance and/or color stability of hydrocarbon polymers, such as butylated hydroxy toluene, sterically hindered phenols, e.g., 3,4,4'-thiobis-(2-tert.butyl-5-methyl phenol) and the like. Suitable stabilizers are well known to those skilled in the art. Preferred molding powders of the present invention contain added stabilizer. Stabilizer may be incorporated into the molding powder by any method conventionally employed for that purpose.

Suitable fillers include asbestos, pigments, glass, metal powders, abrasive powders, graphite, polytetrafluoroethylene powder, especially if partially degraded, and the like. Such fillers generally may be incorporated for the purpose of improving such properties as resistance to creeping under load, lubricity, wear resistance, stiffness, thermal conductivity, electrical insulating properties and hardness. In general, fillers may be incorporated in any amount up to about 40 percent, preferably up to about 30 percent by volume. In order to optimize properties of the molded product, the filler should be of fine particle size and of narrow particle size distribution, similar to those of the polymer component of the molding powder. In preferred operation filled molding powders of the present invention are made by co-milling polymer and filler.

It will be apparent that many modifications and variations can be effected without departing from the scope of the novel concepts of the present invention and the illustrative details disclosed are not to be construed as imposing undue limitations on the invention.

I claim:

1. Molding powder of ultra-high molecular weight linear polyethylene, having molecular weight of at least $1 \times 10^6$ and density of 0.92 to 0.99, free-sinterable above its crystalline melting point after molding under pressure of at least 2,000 p.s.i. to form a solid article having tensile strength of at least 4,000 p.s.i. and elongation of at least 200 percent, comprising particles of less than 100 micron mean particle size having distribution function of less than 0.80.

2. Molding powder according to claim 1 comprising particles having distribution function of less than 0.70.

3. Molding powder according to claim 1 comprising particles of less than 75 micron mean particle size.

4. Molding powder according to claim 3 having distribution function of less than 0.70.

5. Molding powder according to claim 1 having molecular weight of at least $2 \times 10^6$.

6. Molding powder according to claim 5 comprising particles of less than 75 micron mean particle size having distribution function of less than 0.70.

7. Molding powder according to claim 1 containing stabilizer.

8. Molding powder according to claim 1 containing a filler.

References Cited

UNITED STATES PATENTS

| | | | |
|---|---|---|---|
| 3,634,385 | 1/1972 | Walles et al. | 260—94.9 GD |
| 3,245,934 | 4/1966 | Krzyszkowski | 260—94.9 GD |
| 3,665,068 | 5/1972 | Duling et al. | 260—94.9 GD |
| 3,607,793 | 9/1971 | Mahlman | 260—94.9 GD |
| 3,070,549 | 12/1962 | Ziegler et al. | 260—94.9 F |
| 3,536,645 | 10/1970 | Miller | 260—94.9 GD |

JOSEPH L. SCHOFER, Primary Examiner

A. HOLLER, Assistant Examiner

U.S. Cl. X.R.

260—94.9 F; 264—15, 126